United States Patent
Kim et al.

(10) Patent No.: US 8,709,630 B2
(45) Date of Patent: Apr. 29, 2014

(54) RECHARGEABLE BATTERY INCLUDING A CHANNEL MEMBER

(75) Inventors: Yong-Sam Kim, Yongin-si (KR);
Sung-Bae Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 515 days.

(21) Appl. No.: 12/805,744

(22) Filed: Aug. 18, 2010

(65) Prior Publication Data

US 2011/0097613 A1    Apr. 28, 2011

(30) Foreign Application Priority Data

Oct. 26, 2009    (KR) .................. 10-2009-0101815

(51) Int. Cl.
*H01M 2/12* (2006.01)
(52) U.S. Cl.
USPC ............ 429/88; 429/82; 429/86; 429/87; 429/89
(58) Field of Classification Search
None
See application file for complete search history.

(56) References Cited

U.S. PATENT DOCUMENTS

| | | | |
|---|---|---|---|
| 6,838,207 B1 * | 1/2005 | Sugita ........................ | 429/82 |
| 7,420,541 B2 | 9/2008 | Lee et al. | |
| 2006/0246349 A1 * | 11/2006 | Uh ............................. | 429/175 |
| 2008/0206633 A1 | 8/2008 | Matsuoka | |
| 2009/0061310 A1 * | 3/2009 | Kim et al. ................... | 429/185 |

FOREIGN PATENT DOCUMENTS

| | | |
|---|---|---|
| JP | 2000-277081 A | 10/2000 |
| JP | 2004-030946 A | 1/2004 |
| JP | 2005-267645 A | 9/2005 |
| JP | 2005-267945 A | 9/2005 |
| JP | 2008-210620 A | 9/2008 |
| KR | 10-1999-0057618 A | 7/1999 |
| KR | 10-2001-0061303 A | 7/2001 |

OTHER PUBLICATIONS

Korean Notice of Allowance in KR 10-2009-0101815, dated Oct. 31, 2011 (Kim, et al.).
Korean Office Action in KR 10-2009-0101815, dated Mar. 21, 2011, (Kim, et al.)

* cited by examiner

*Primary Examiner* — Kwang Han
(74) *Attorney, Agent, or Firm* — Lee & Morse, P.C.

(57) ABSTRACT

A rechargeable battery including an electrode assembly capable of being charged and discharged; a case accommodating the electrode assembly; a cap assembly, the cap assembly including a cap plate coupled to an opening of the case, and a vent member in the cap plate, the vent member being configured to open at a predetermined internal pressure, a terminal exposed to an outer side of the cap plate; a lower insulating member, the lower insulating member insulating the terminal and the cap plate at a lower side of the cap plate; and a channel member between the electrode assembly and the cap plate and forming a space, the channel member being fixed to the lower insulating member.

13 Claims, 4 Drawing Sheets

RECHARGEABLE BATTERY INCLUDING A CHANNEL MEMBER

BACKGROUND

1. Field

Embodiments relate to a rechargeable battery.

2. Description of the Related Art

A rechargeable battery may be recharged and discharged, unlike a primary battery that cannot be recharged. A low-capacity rechargeable battery may be used for small portable electronic devices, e.g., mobile phones, notebook computers, or camcorders. A large-capacity rechargeable battery may be used as, e.g., a motor-driving power source or a large-capacity power storage for hybrid automobiles and the like.

Recently, a high-output rechargeable battery using a non-aqueous electrolyte with high energy density has been under development. A plurality of high-output rechargeable batteries may be connected in series to constitute a large-capacity battery module to be used for driving a motor of a device requiring much power, e.g., an electric automobile and the like. The rechargeable battery may have, e.g., a cylindrical shape, a shape with squared-off corners (i.e., a quadrangular shape), and the like.

The rechargeable battery with squared off corners may include an electrode assembly in which a positive electrode and a negative electrode are positioned with a separator interposed therebetween, a case having a space in which the electrode assembly is installed, a cap plate hermetically sealing the case, and a terminal electrically connected to the electrode assembly and protruding from an outer surface of the case through the cap plate.

If excessive heat is generated in an interior of the rechargeable battery and/or if the electrolyte vaporizes, thereby increasing an internal pressure of the rechargeable battery, the rechargeable battery may explode. Thus, in order to avoid such explosion of the battery, a vent that opens at a predetermined pressure may be installed. In order to allow a gas to be stably discharged through the vent, sufficient space should exist between the vent and the electrode assembly.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery, which represents advances over the related art.

It is a feature of an embodiment to provide a rechargeable battery having an improved gas discharge structure and improved stability.

It is another feature of an embodiment to provide a rechargeable battery having a space below the vent member to allow a gas to be stably discharged.

At least one of the above and other features and advantages may be realized by providing a rechargeable battery including an electrode assembly capable of being charged and discharged; a case accommodating the electrode assembly; a cap assembly, the cap assembly including a cap plate coupled to an opening of the case, and a vent member in the cap plate, the vent member being configured to open at a predetermined internal pressure, a terminal exposed to an outer side of the cap plate; a lower insulating member, the lower insulating member insulating the terminal and the cap plate at a lower side of the cap plate; and a channel member between the electrode assembly and the cap plate and forming a space, the channel member being fixed to the lower insulating member.

The channel member may include a support protrusion, and the lower insulating member may include a fixing recess into which the support protrusion is inserted.

The channel member may include a blocking plate disposed below the vent member, and separation plates fixed to the blocking plate, the separation plates protruding upwardly from the blocking plate to separate the blocking plate from the cap plate.

The channel member may further include upper support plates disposed at both ends of the separation plates in a lengthwise direction such that the upper support plates are separated from and above the blocking plate, and the support protrusions may be disposed at outer ends of the upper support plates.

The upper support plates may be parallel to the blocking plate.

The cap plate may include an electrolyte injection opening, the upper support plates may include at least one first avoiding recess, and the at least one first avoiding recess may be disposed below the electrolyte injection opening.

The blocking plate may include at least one second avoiding recess, the at least one second avoiding recess being disposed below and aligned with the at least one first avoiding recess and with the electrolyte injection opening.

The blocking plate may contact an upper end of the electrode assembly.

The channel member may include auxiliary holes, the auxiliary holes being disposed along a widthwise direction of the blocking plate and penetrating therethrough.

The blocking plate may extend along a lengthwise direction of the cap plate to have a widthwise direction and a lengthwise direction, and two separation plates may be coupled with the blocking plate such that they are parallel to each other at opposite sides of the blocking plate in the widthwise direction.

The blocking plate may be made of a porous material.

The blocking plate may include a plurality of pores penetrating therethrough.

The separation plates may contact a lower surface of the cap plate.

The electrode assembly may be connected to the terminal through a lead member, the lead member including a hole allowing gas generated from an interior of the electrode assembly to flow to an outer side of the electrode assembly.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
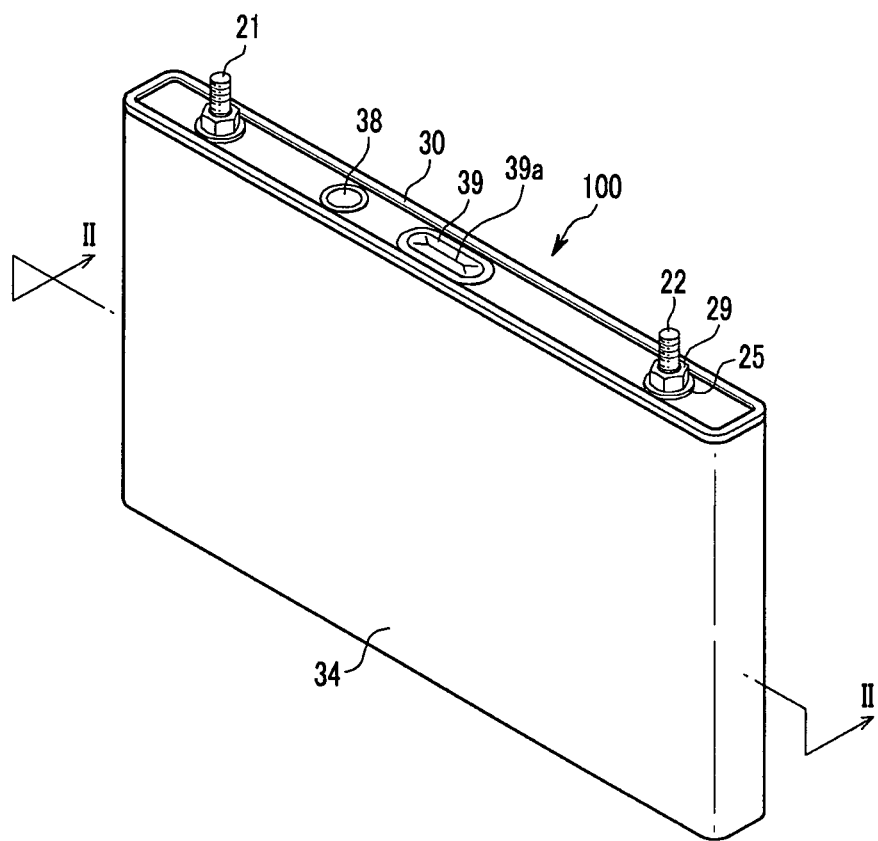
FIG. 1 illustrates a perspective view of a rechargeable battery according to an embodiment.

Korean Patent Application No. 10-2009-0101815, filed on Oct. 26, 2009, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "below" another element, it can be directly below, or one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
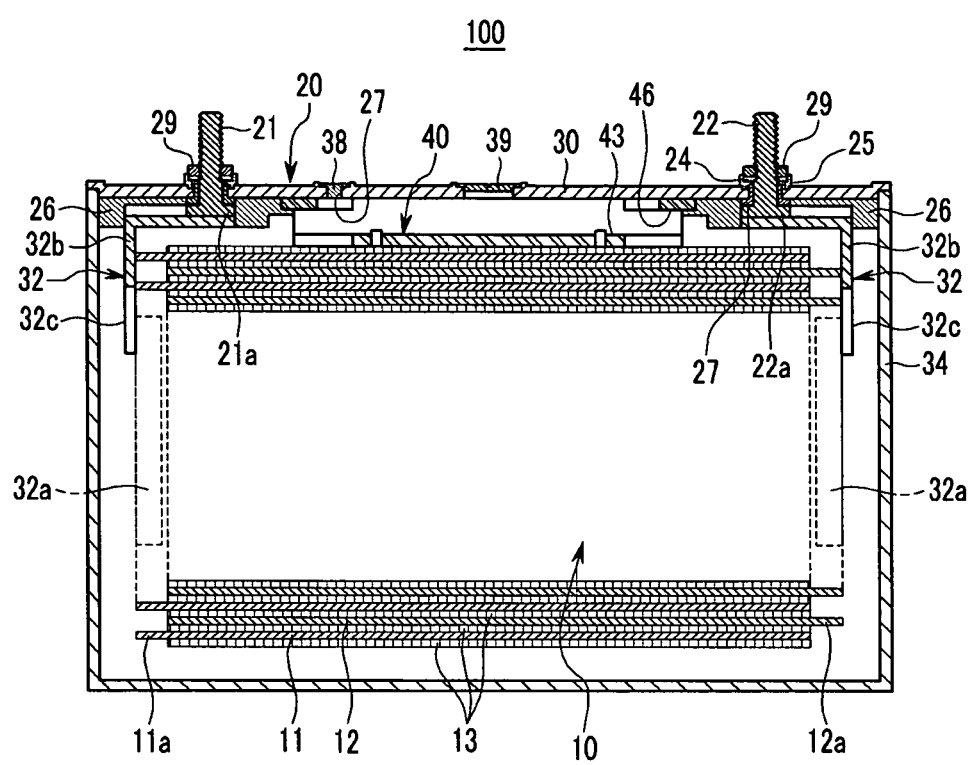
FIG. 2 illustrates a cross-sectional view taken along line II-II in FIG. 1.

FIG. 1 illustrates a perspective view of a rechargeable battery according to an embodiment. FIG. 2 illustrates a cross-sectional view taken along line II-II in FIG. 1.

With reference to FIGS. 1 and 2, the rechargeable battery 100 according to the present embodiment may include an electrode assembly 10 formed by winding a positive electrode 11 and a negative electrode 12 with a separator 13 interposed therebetween, a case 34 accommodating the electrode assembly 10 therein, and a cap assembly 20 coupled to an opening of the case 34.

In an implementation, the rechargeable battery 100 may be a lithium ion rechargeable battery with a quadrangular, i.e., cubic or prismatic, shape. However, the embodiments are not limited thereto, and the battery may include, e.g., a lithium polymer battery, a cylindrical battery, and the like.

The positive electrode 11 and the negative electrode 12 may include a coated region, i.e., a region formed by coating an active material on a current collector formed as a metal foil, and uncoated regions 11a and 12a of the current collector where an active material is not coated.

The positive electrode uncoated region 11a may be formed at one end of the positive electrode 11 along a lengthwise direction of the positive electrode 11. The negative electrode uncoated region 12a may be formed at another, e.g., opposite, end of the negative electrode 12 along a lengthwise direction of the negative electrode 12. The positive electrode 11 and the negative electrode 12 may be wound with the separator 13, which is an insulator, interposed therebetween.

However, the embodiments are not limited thereto, and the electrode assembly 10 may have a structure in which, e.g., positive and negative electrodes are each made up of a plurality of sheets stacked with a separator interposed therebetween.

The case 34 may have a shape that features rectangular sides, and an opening may be formed at one side of the case 34. The cap assembly 20 may include a cap plate 30 covering the opening of the case 34. A positive terminal 21 may be electrically connected to the positive electrode 11 and may protrude through the cap plate 30 to an outer side of the cap plate 30. A negative terminal 22 may be electrically connected to the negative electrode 12 and may protrude through the cap plate 30 to the outer side of the cap plate 30. The cap plate 30 may include a vent member 39 including a notch 39a configured to burst according to a predetermined internal pressure, thus opening the vent member 39.

The cap plate 30 may be formed as a thin plate. The cap plate 30 may include an electrolyte injection opening 27 formed at one portion thereof to allow electrolyte to be injected therethrough. A sealing stopper 38 may be installed in the electrolyte injection opening 27 after injection of the electrolyte.

A gasket 25 may be installed between the cap plate 30 and the terminals 21 and 22 to insulate the cap plate 30 and the terminals 21 and 22. The terminals 21 and 22 may include the positive terminal 21 and the negative terminal 22. The gasket 25 may be inserted into a terminal hole and may include two parts that are tightly attached to upper and lower portions of the terminal hole.

The terminals 21 and 22 may have a cylindrical shape. A nut 29 may be installed to support the terminals 21 and 22 at an upper side. A screw thread may be formed on an outer circumference of the terminals 21 and 22 to allow the nut 29 to be fastened thereto. Terminal flanges 21a and 22a may be formed at lower ends of the terminals 21 and 22 to support the terminals 21 and 22 from the lower side.

Lower insulating members 26 may be installed between the terminal flanges 21a and 22a and the cap plate 30 to insulate therebetween. The lower insulating members 26 may include terminal holes 26a into which the terminals 21 and 22 may be inserted. A lead member 32 electrically connected to the positive electrode 11 or the negative electrode 12 may be welded to the terminal flanges 21a and 22a. The terminal flanges 21a and 22a and the lead member 32 may be inserted into recesses disposed on a lower surface of the lower insulating members 26.

The lead member 32 may include uncoated region attachment portions 32a attached to the uncoated regions 11a and 12a and end portions 32b positioned at the side of the electrode assembly 10. The uncoated region attachment portions 32a may be bent relative to the end portions 32b so as to be parallel to the uncoated regions 11a and 12a and welded to the uncoated regions 11a and 12a. Holes 32c may be formed in the end portions 32b to allow a gas generated from an interior of the electrode assembly 10 to be discharged therethrough.

A channel member 40 may be installed between the lower insulating members 26, disposed at both sides, to thereby form a gas flow path below the cap plate 30.

Figure 3:
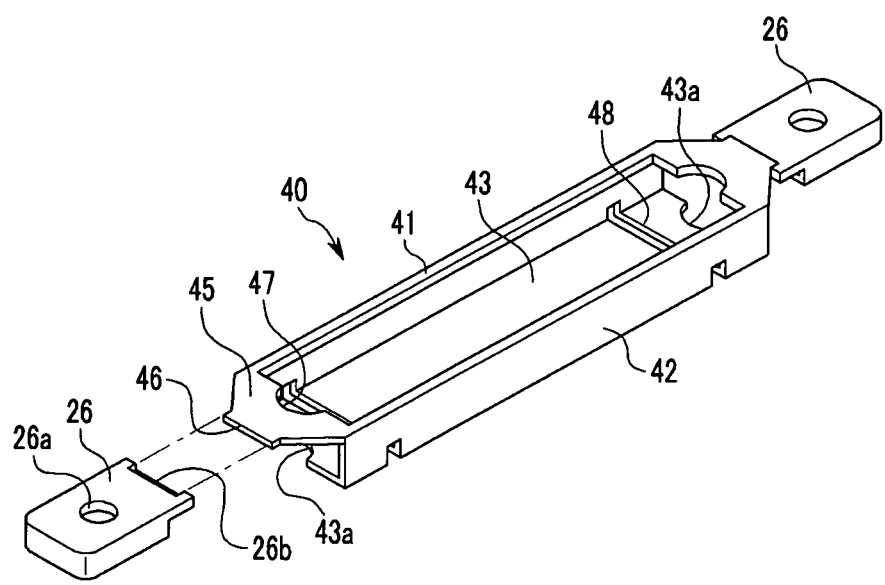
FIG. 3 illustrates a perspective view of a channel member according to an embodiment.

FIG. 3 illustrates a perspective view of the channel member according to an embodiment.

With reference to FIG. 3, the channel member 40 according to the present embodiment may include a blocking plate 43 parallel to the cap plate 30 and separation plates 41 and 42 coupled to the blocking plate 43 in order to separate the blocking plate 43 from the cap plate 30. Upper support plates 45 may be disposed at both end portions of the separation plates 41 and 42 in a lengthwise direction such that the upper support plates 45 are parallel to and above the blocking plate 43.

The separation plates 41 and 42 may be perpendicular to the blocking plate 43 at both sides of the blocking plate 43. The separation plates 41 and 42 may protrude toward the cap plate 30 in order to separate the blocking plate 43 from the cap plate 30. Accordingly, a space allowing a gas to flow may be formed between the blocking plate 43 and the cap plate 30.

An area between the separation plates 41 and 42 may be open. Accordingly, gas may flow between the separation plates 41 and 42. Also, both ends of the channel member 40 may be connected to prevent generation of a pressure difference at both ends of the channel member 40. The channel member may include auxiliary holes 48 through the blocking plate 43 between the electrode assembly 10 and the space between the separation plates 41. The auxiliary holes 48 may extend across a width of the blocking plate 43. The auxiliary holes 48 may be separately disposed adjacent to both ends of the blocking plate 43.

The auxiliary holes 48 may allow for distribution of pressure when the vent member 39 is open, thereby allowing the gas to be discharged in various directions. The auxiliary holes 48 may allow the gas below the channel member 40, after having been released from the interior of the electrode assembly 10, as well as the gas beside the channel member 40, to be quickly discharged.

By contrast, if only end portions of the channel member were to be open, a portion of the electrode assembly 10 or foreign material, e.g., electrolyte or the like, could potentially rise due to a rapid change in pressure, undesirably hindering smooth gas discharge. However, because of the presence of the auxiliary holes 48, the gas may be smoothly discharged through the auxiliary holes 48 when the electrode assembly 10 is separated from the channel member 40.

The blocking plate 43 may be disposed below the vent member 39. Thus, when a rapid change in pressure occurs below the vent member 39 as the vent member 39 is opened, the blocking plate 43 may restrain the pressure from directly affecting the electrode assembly 10 and the electrolyte, i.e., it may prevent undesirable movement of the electrode assembly 10 or the electrolyte.

Support protrusions 46 may be disposed at ends of the upper support plates 45. In addition, fixing recesses 26b may be formed on the lower insulating members 26 into which the support protrusions 46 may be inserted. The fixing recesses 26b may be formed at an end of an upper surface of the lower insulating members 26. Such fixing recesses 26b may be formed such that upper portions thereof are open and lower portions thereof are closed. In other words, the fixing recesses 26b may have, e.g., a stepped structure. Accordingly, when the support protrusions 46 are inserted into the fixing recesses 26b, the channel member 40 may not move downward with respect to the lower insulating members 26 and may thereby be stably fixed by the lower insulating members 26. Also, because the lower insulating members 26 may fix the channel member 40 from both sides, the channel member 40 may be prevented from moving in a lateral direction.

At least one first avoiding recess 47 may be disposed at an end portion of the upper support plate 45 opposite to the support protrusion 46. In addition, at least one second avoiding recess 43a may be disposed in the blocking plate 43. In an implementation, the first and second avoiding recesses 47 and 43b may be aligned with the electrolyte injection opening 27. Accordingly, electrolyte may be easily introduced into the rechargeable battery 100. Also, the second avoiding recess 43a in the blocking plate 43 may be connected to, i.e., may enlarge, the open end to allow the gas to be introduced to the interior of the channel member 40 from a lower side thereof through the second avoiding recess 43a. Accordingly, gas may be discharged more quickly. The speed at which the gas is discharged is very significant. In particular, if the gas fails to be quickly discharged, the case might explode.

In this manner, because the channel member 40 may be installed between the cap plate 30 and the electrode assembly 10, the electrode assembly 10 may be prevented from rising, undesirably reducing the space between the cap plate 30 and the electrode assembly 10. Accordingly, the channel member 40 may easily secure a passage for discharging the gas when the vent member 39 is open. The gas may freely pass through the openings at lower portions of the channel member 40.

Also, because the channel member 40 may be fixed to the lower insulating members 26, the channel member 40 may be easily fixedly installed below the cap assembly 20 and stably positioned within the case 34 without moving due to, e.g., an impact applied from outside the rechargeable battery.

Also, the separation plates 41 and 42 may be disposed such that upper ends thereof are in contact with the lower surface of the cap plate 30. Accordingly, the blocking plate 43 may stably secure the electrode assembly 10 when the vent member 39 is open, thus preventing the electrode assembly 10 from rising.

Figure 4:
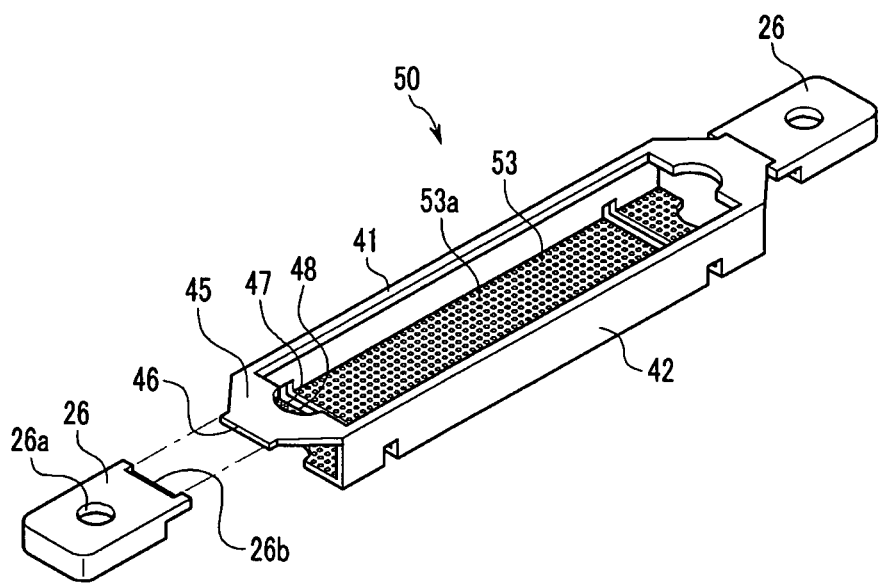
FIG. 4 illustrates a perspective view of a channel member of a rechargeable battery according to another embodiment.

FIG. 4 illustrates a perspective view of a channel member of a rechargeable battery according to another embodiment.

The rechargeable battery according to the present embodiment may have the same elements as the rechargeable battery according to the previous embodiment as described above, except for the configuration of a channel member, so a repeated description of the same elements will be omitted.

With reference to FIG. 4, a channel member 50 may include a blocking plate 53 parallel to the cap plate 30 and separation plates 41 and 42 at both sides of the blocking plate 53.

The channel member 50 according to the present embodiment may have the same structure as that of the channel member according to the previous embodiment, except for the configuration of the blocking plate 53, so a repeated description of the same structure will be omitted.

The blocking plate 53 may be made of a porous material, i.e., with a plurality of fine pores 53a passing therethrough. The blocking plate 53 may be disposed parallel to the cap plate 30. Accordingly, gas may be discharged through the blocking plate 53 as well as through an opening between the separation plates 41 and 42 and the blocking plate 53. Because the blocking plate 53 may be made of the porous material, the distance the gas must travel to be discharged may be minimized. Such a minimized distance may allow the gas to be quickly discharged, advantageously preventing explosion of the rechargeable battery.

In the rechargeable battery of an embodiment, when the gas is discharged, the electrode assembly may be prevented from rising together with the gas, thus avoiding undesirable closing of the vent hole. Accordingly, the gas may stably discharge, thus avoiding an increase in the internal pressure of the rechargeable battery, ultimately preventing explosion of the rechargeable battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
   an electrode assembly capable of being charged and discharged;
   a case accommodating the electrode assembly;
   a cap assembly, the cap assembly including:
      a cap plate coupled to an opening of the case, and
      a vent member in the cap plate, the vent member being configured to open at a predetermined internal pressure,
   a terminal exposed to an outer side of the cap plate;
   a lower insulating member, the lower insulating member insulating the terminal and the cap plate at a lower side of the cap plate; and
   a channel member between the electrode assembly and the cap plate and forming a space, the channel member:
      being fixed to the lower insulating member, including a blocking plate below the vent member, and
including auxiliary holes in the blocking plate, the auxiliary holes penetrating through the blocking plate across an entire widthwise direction of the blocking plate such that each auxiliary hole continuously extends from one side of the case to another side of the case.

2. The rechargeable battery as claimed in claim 1, wherein:
the channel member includes a support protrusion, and
the lower insulating member includes a fixing recess into which the support protrusion is inserted.

3. The rechargeable battery as claimed in claim 2, wherein the channel member includes:
separation plates fixed to the blocking plate, the separation plates protruding upwardly from the blocking plate to separate the blocking plate from the cap plate.

4. The rechargeable battery as claimed in claim 3, wherein:
the channel member further includes upper support plates disposed at both ends of the separation plates in a lengthwise direction such that the upper support plates are separated from and above the blocking plate, and
the support protrusions are disposed at outer ends of the upper support plates.

5. The rechargeable battery as claimed in claim 4, wherein the upper support plates are parallel to the blocking plate.

6. The rechargeable battery as claimed in claim 4, wherein:
the cap plate includes an electrolyte injection opening,
the upper support plates include at least one first avoiding recess, and
the at least one first avoiding recess is disposed below the electrolyte injection opening.

7. The rechargeable battery as claimed in claim 6, wherein the blocking plate includes at least one second avoiding recess, the at least one second avoiding recess being disposed below and aligned with the at least one first avoiding recess and with the electrolyte injection opening.

8. The rechargeable battery as claimed in claim 3, wherein the blocking plate contacts an upper end of the electrode assembly.

9. The rechargeable battery as claimed in claim 3, wherein the blocking plate extends along a lengthwise direction of the cap plate to have the widthwise direction and a lengthwise direction, and wherein two separation plates are coupled with the blocking plate such that they are parallel to each other at opposite sides of the blocking plate in the widthwise direction.

10. The rechargeable battery as claimed in claim 3, wherein the blocking plate is made of a porous material.

11. The rechargeable battery as claimed in claim 3, wherein the blocking plate includes a plurality of pores penetrating therethrough.

12. The rechargeable battery as claimed in claim 3, wherein the separation plates contact a lower surface of the cap plate.

13. The rechargeable battery as claimed in claim 2, wherein the electrode assembly is connected to the terminal through a lead member, the lead member including a hole allowing gas generated from an interior of the electrode assembly to flow to an outer side of the electrode assembly.

* * * * *